(12) United States Patent
Bohannon et al.

(10) Patent No.: US 8,150,893 B2
(45) Date of Patent: Apr. 3, 2012

(54) METHOD AND APPARATUS FOR INCREMENTAL EVALUATION OF SCHEMA-DIRECTED XML PUBLISHING

(75) Inventors: Philip L. Bohannon, Bridgewater, NJ (US); Wenfei Fan, Somerset, NJ (US)

(73) Assignee: Alcatel Lucent, Paris (FR)

( * ) Notice: Subject to any disclaimer, the term of this patent is extended or adjusted under 35 U.S.C. 154(b) by 1470 days.

(21) Appl. No.: 11/025,844

(22) Filed: Dec. 29, 2004

(65) Prior Publication Data

US 2006/0173861 A1    Aug. 3, 2006

(51) Int. Cl.
   *G06F 17/30* (2006.01)
(52) U.S. Cl. ........................................ 707/803
(58) Field of Classification Search .................. 707/1, 3, 707/100, 102, 705, 706, 713, 792, 797, 803; 715/513
   See application file for complete search history.

(56) References Cited

U.S. PATENT DOCUMENTS

| | | | |
|---|---|---|---|
| 7,020,659 B2* | 3/2006 | Yorke | 707/102 |
| 7,072,896 B2* | 7/2006 | Lee et al. | 707/101 |

OTHER PUBLICATIONS

Wang et al ("Updating Xquery Views Published over Relational Data: A round-trip Case Study", vol. 2864, p. 223-237 Sep. 2003).*
Barsalou et al. "Updating Relational Databases through Object-Based Views", 1991, "Proceedings of the 1991 ACM SIGMOD international conference on Management of Data", pp. 248-257.*
Braganholo et al. "Updating Relational Databases Through XML Views", 2001, "3rd International Conference on Information Integration and Web-based Applications and Services".*
Dayal et al., "On the Correct Translation of Update Operations on Relational Views", Sep. 1982, "ACM Transactions on Database Systems", vol. 7, Issue 3, pp. 381-416.*
Fong et al, "Converting Relational Database into XML Document", 2001, IEEE, p. 61-65.*

* cited by examiner

*Primary Examiner* — Cam-Linh Nguyen
(74) *Attorney, Agent, or Firm* — Ryan, Mason & Lewis, LLP

(57) ABSTRACT

Methods and apparatus are provided for incremental update of an XML tree defined from a recursive XML view of a relational database. A method comprises the steps of detecting at least one change to the relational database; providing one or more queries to the relational database to map the change to the relational database into changes to the XML tree, wherein at least one component of a definition of the one or more queries is executed a plurality of times in traversing a path through the XML tree; and applying the mapped change to the XML tree. A bud-cut method and a reduction approach are presented.

20 Claims, 10 Drawing Sheets

*FIG. 1*
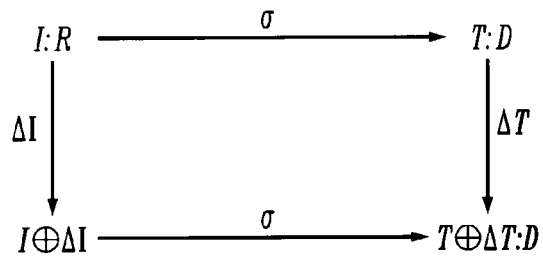
*FIG. 2*
```
<!ELEMENT db         (course*)>
<!ELEMENT course     (cno, title, type, prereq, takenBy)>
<!ELEMENT type       (regular | project)>
<!ELEMENT prereq     (course*)>
<!ELEMENT takenBy    (student*)>
<!ELEMENT student    (ssn, name)>
<!ELEMENT regular    (empty)>     /* similarly for project */
```
*FIG. 3*
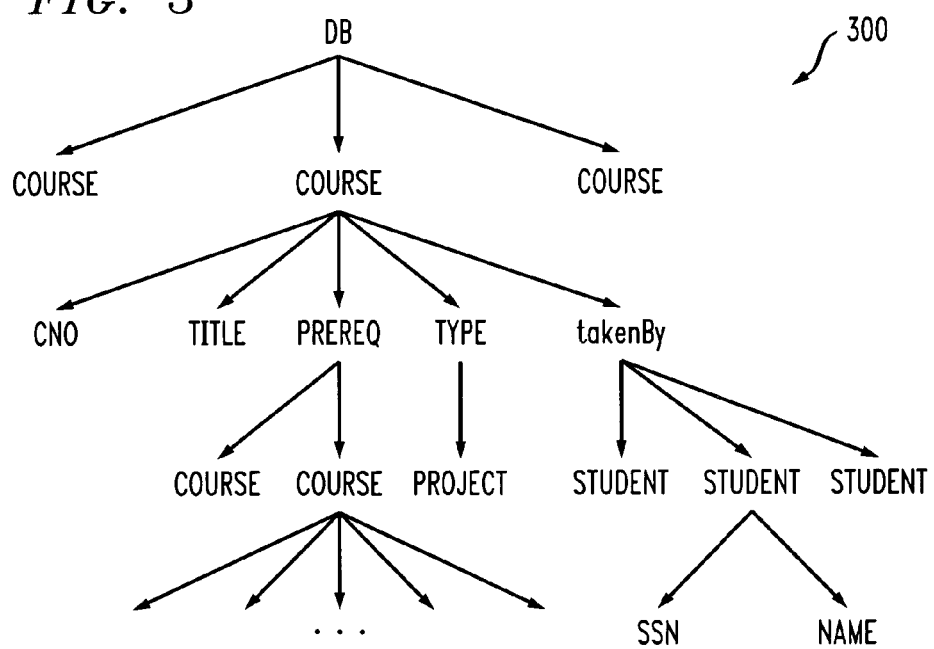

FIG. 4

```
db → course*
    $course ← Q₁
    Q₁:      select   distinct c.cno, c.title, 1 as tag
             from     course c
             where    c.dept = "CS"
             union
             select   distinct p.cno, p.title, 2 as tag
             from     project: P
             where    p.dept = "CS"

course → cno, title, type, prereq, takenBy
    $cno = $course.cno,      $title = $course.title,
    $type = $course.tag,     $prereq = $course.cno,
    $takenBy = $course.cno type → regular + project
    ($regular, $project) = case $type of
                              1: ($type, null)
                              2: (null, $type)

prereq → course*
    $course ← Q₂($prereq)
    Q₂(c1):  select   distinct c.cno, c.title, 1 as tag
             from     prereq p, course c
             where    p.cno1 = c1 and p.cno2 = c.cno takenBy → student*
    $student ← Q₃($takenBy)
    Q₃(c):   select   distinct s.ssn, s.name
             from     enroll e, student s
             where    e.cno = c and e.ssn = s.ssn
```

FIG. 7

$Q_{gen\_prereq}$:
```
select    gen_course.cno
from      gen_course gc
```

$Q_{gen\_course}$:
```
select    distinct c.cno, c.title, 1 as tag   /* Q'₁ */
from      course c
where     c.dept = "CS"
union
select    distinct p.cno, p.title, 2 as tag
from      project: p
where     p.dept = "CS"
union                                          /* Q'₂: */
select    distinct c.cno, c.title, 1 as tag
from      prereq p, course c, gen_prereq g
where     p.cno1 = g.cno and p.cno2 = c.cno
```

FIG. 8

$Q_{edge\_course\_title}$:
```
select    gen_id(c), gen_id(c.title)
from      gen_course c
```

$Q_{edge\_prereq\_course}$:      /* derived from Q'₂ */
```
select    gen_id(gp), gen_id(c.cno, c.title, 1)
from      gen_prereq gp, prereq p, course c
where     p.cno1 = gp.cno and p.cno2 = c.cno
```

FIG. 9

```
with QC1(cno, title, ...) as (Q1 from Figure 4)
with QC2(idc, idp, pq_idp, pq_idc, srel)
    recursive as {
    select    gen_id(c.cno, c.title, 1) from QC1
    union
    select    gen_id(gp), gen_id(c.cno, c.title, 1),
              null, null, "course"
    from      QC2 gp, prereq p, course c
    where     p.cno1 = gp.cno and p.cno2 = c.cno
              and gp.srel == "prereq"
    union
    select    null, null, cno as pq_idc,
              cno as pq_idp, "prereq"
    from      QC2 gc
    where     gc.srel == "course"  }
select  distinct cno, title, tag
from    QC2, course
where   QC2.srel="course" and QC2.idc=course.cno
```

FIG. 10

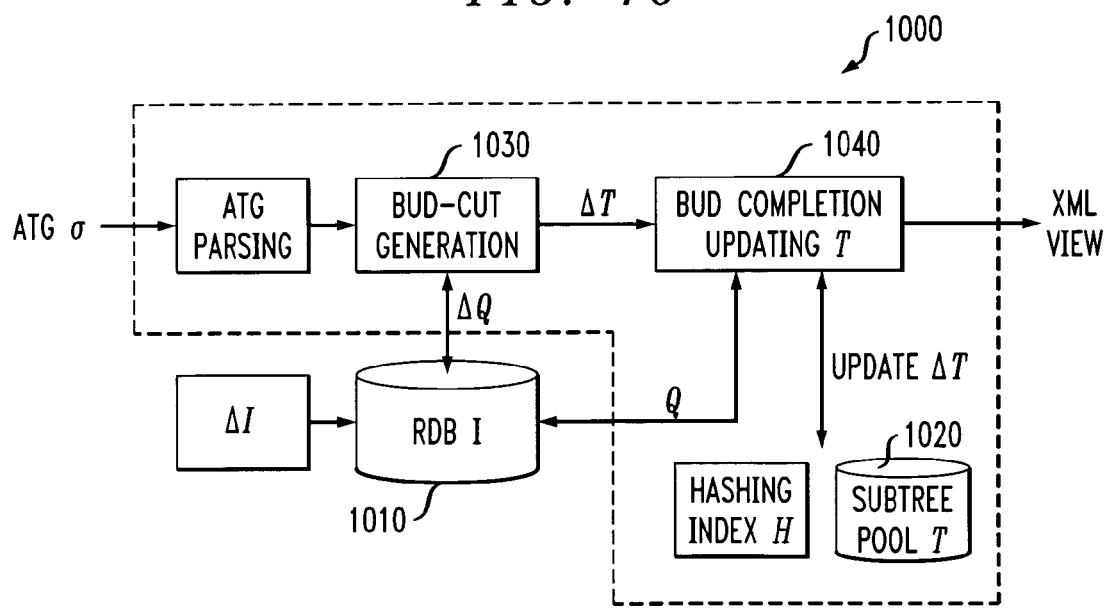

FIG. 11

```
create view old_course as
    select * from course
        where not exists (
                select 0 from Δcourse dc
                        where dc.cno = course.cno   );

ΔQ_edge_prereq_course:
    select      p.cnt, gen_id(gp), gen_id(c.cno, c.title, 1),
                c.cno, c.title, 1 as tag
    from        gen_prereq gp, Δprereq p, course c
    where       p.cno1 = gp.cno and p.cno2 = c.cno
    union
    select      c.cnt, gen_id(gp), gen_id(c.cno, c.title, 1),
                c.cno, c.title, 1 as tag
    from        gen_prereq gp, old_prereq p, Δcourse c
    where       p.cno1 = gp.cno and p.cno2 = c.cno
```

FIG. 12

```
ΔQ^BUD_edge_prereq_course(BUD_prereq):
    select      gen_id(gp), gen_id(c.cno, c.title, 1 as tag),
                c.cno, c.title, 1 as tag
    from        BUD_prereq gp, prereq p, course c
    where       p.cno1 = gp.cno and p.cno2 = c.cno
```

FIG. 13 ⎯1300

Input: newly inserted nodes $Bud_A$ for all element types $A$ in $\sigma$.
Output: completed subtrees for all nodes in $Bud_A$'s.

1. repeat
2.   for all nonempty $Bud_A$ with $A$ in $\sigma$ do
3.     case the production $p = A \to \alpha$ of 4.     (1)   $A \to B_1,..., B_n$:
5.         for each tuple $t$ in $Bud_A$ do
6.           for $i$ from 1 to $n$ do
7.             $\$B_i := f_i(t);$     /*$f_i$ in $rule(p)$ for $\$B_i$ */
8.             $process(B_i, \$B_i);$
9.         let $v = H(A, t).ptr;$
10.         $v.L := (B_1, gen\_id(\$B_1),..., B_n, gen\_id(\$B_n));$
           /* $gen\_id$: Skolem function */
11.         $Bud_A := 0;$ 12. (2) $A \to B_1 + ... + B_n$:
13.     for each tuple $t$ in $Bud_A$ do   /* $f$ in $rule(p)$*/
14.         evaluate $f(t)$ to find the unique $\$B_i \neq$ null;
15.         $process(B_i, t);$
16.         let $v = H(A, t).ptr;$
17.         $v.L := (B_i, t);$
18.     $Bud_A := 0;$ 19. (3) $A \to B^+$:
20.     $X := \Delta Q^{Bud}_{edge\_A\_B}(Bud_A);$   /* sending $Bud_A$ to DBMS */
21.     /* executing the incremental edge-generating query*/
22.         for each tuple $(id\_A, id\_B, \$B)$ in $X$ do
23.             let $v = H(A, id\_(A)).ptr;$
24.             if $(B, id\_B)$ is not in $v.L$
25.             then insert $(B, id\_B)$ into $v.L;$
26.               $process\ (B, \$B);$
27.     $Bud_A := 0;$ 28. (4) $A \to str$:
29.     for each tuple $t$ in $Bud_A$ do
30.         let $v = H(A, t).ptr;$
31.         $v.L := str\ (t);$ /* computes PCDATA from $t$ */
32.     $Bud_A := 0;$ 33. until $budrelA = 0$ for all $A$ in $\sigma$;

FIG. 13 cont.

Procedure process($A$, $t$)

Input: element type $A$, tuple $t$ as a value of $\$A$.
Output: modified index $H$, subtree pool and the sets $Bud_A$.

1. $tid := gen\_id(t)$;  /*$gen\_id$: Skolem function*/
2. if $(A, tid)$ is an entry of $H$
3. then return;
4. create a node $v = (A, tid, [\ ])$ in the subtree pool;
5. create an entry $(A, tid)$ in $H$;
6. $H(A, tid).ptr := \&v$;  /*address of $v$*/
7. $H(A, t).L := [\ ]$;  /* empty list */
8. $Bus_A := Bud_A \cup \{t\}$;  /*newly created nodes */
9. return;

FIG. 14

Base queries and $Q_gX$:
1. $Q\_db \to course$:
   (Unchanged from $Q_1$)
2. $Q\_course \to cno = Q_{gen\_cno}$:
   select c.cno
   from gen_course c ;
3. $Q\_course \to prereq = Q_{gen\_prereq}$:
   select c.cno
   from gen_course c ;
4. $Q\_course \to type = Q_{gen\_type}$:
   select c.tag as type
   from gen_course c ;
5. $Q\_course \to takenby = Q_{gen\_takenby}$:
   select c.cno
   from gen_course c ;
6. $Q\_type \to regular = Q_{gen\_regular}$:
   select g.type
   from gen_type g
   where g.type = 1 ;
7. $Q\_type \to project = Q_{gen\_project}$:
   select g.type
   from gen_type g
   where g.type = 2 ;
8. $Q\_prereq \to course$:
   select    distinct c.cno, c.title, 1 as tag
   from      gen_prereq gp, prereq p, course c
   where     p.cno1 = gp.cno and p.cno2 = c.cno ;
9. $Q\_takenby \to student = Q_{gen\_student}$:
   select    distinct s.ssn, s.name
   from      enroll e, student s
   where     e.cno = c and e.ssn = s.ssn ;
10. $Q_{gen\_course}$:
    select    distinct c.cno, c.title, 1 as tag
    from      gen_prereq gp, prereq p, course c
    where     p.cno1 = gp.cno and p.cno2 = c.cno
    union
    select    distinct c.cno, c.title, 1 as tag    // Q1
    from      course c
    where     c.dept = "CS"
    union
    select    distinct p.cno, p.title, 2 as tag
    from      project: p
    where     p.dept = "CS"

US 8,150,893 B2

METHOD AND APPARATUS FOR INCREMENTAL EVALUATION OF SCHEMA-DIRECTED XML PUBLISHING

FIELD OF THE INVENTION

The present invention relates to techniques for incremental maintenance of data and, more particularly, to methods and apparatus for incremental maintenance of schema-directed XML views.

BACKGROUND OF THE INVENTION

XML publishing by middleware or with direct DBMS support has been well studied, and techniques are rapidly being introduced into commercial products. In some applications, small portions of a database are extracted into "disposable" XML documents, for example, the messages needed to execute or respond to requests using a web-services protocol. However, in many applications including mediation, archiving and web site management, large XML documents may need to be exported. In this case, the cached XML document can be seen as a view of the database instance. For all the reasons that efficient incremental maintenance of views in the database is important, it may also make sense to incrementally update published XML documents, even when they are externally cached by a middleware system. There are no known techniques for incremental evaluation of XML publishing of relational data.

Schema-directed publishing extracts data from a relational database and constructs an XML view that conforms to a predefined schema, such as a Document Type Description (DTD). For example, enterprises typically agree on a common schema for data exchange; thus, a specification for publishing views that ensures schema conformance is an important benefit for developers. In response to this need, the Attribute Translation Grammar (ATG) formalism has been developed, as described in M. Benedikt et al., "DTD-Directed Publishing with Attribute Translation Grammars." VLDB (2002) (hereinafter, referred to as "Benedikt et al."). Generally, an ATG is a mapping ($\sigma$: R$\rightarrow$D) associated with a predefined (and possibly recursive) DTD D that, given an instance I of a relational schema R, computes an XML view Tequal to $\sigma$(I), such that T conforms to D. Given that a DTD D is a set of productions, an ATG associates a set of semantic rules with each production and a single semantic attribute with each element type in D. These rules govern the production of child elements for each element based on the data present in the attribute.

A number of techniques are known for maintaining many kinds of materialized views, such as relational tables, object oriented databases and html pages extracted out of databases. Generally, the materialized views are maintained by keeping the "view" synchronized with the source data, by modifying the view each time the base changes. Thus, when the view is requested, it is up-to-date and can be delivered without further effort. Such view updates, however, are not available for XML publishing.

A number of techniques have been proposed or suggested for mapping XML view queries to Structured Query Language (SQL) queries that compute root-to-leaf paths in a relational encoding of the XML tree. These techniques, however, cannot be directly applied to generating or updating ATG-generated documents due to a lack of support for recursion. A DTD is recursive if it is based on an element type that is defined (directly or indirectly) in terms of itself. A natural and typical way to generate an XML document is through recursive rules. It has been recognized that linear recursion of SQL 99 is sufficient to support XPath queries over shredded XML data, even when the shredding schema is recursive, and that this approach could be applied for publishing queries. Nonetheless, a need still exists for a method and apparatus for incremental maintenance of schema-directed XML views that support recursion.

SUMMARY OF THE INVENTION

Generally, methods and apparatus are provided for incremental update of an XML tree defined from a recursive XML view of a relational database. According to one aspect of the invention, a method comprises the steps of detecting at least one change to the relational database; providing one or more queries to the relational database to map the change to the relational database into changes to the XML tree, wherein at least one component of a definition of the one or more queries is executed a plurality of times in traversing a path through the XML tree; and applying the mapped change to the XML tree.

According to another aspect of the invention, a bud-cut method comprises the steps of submitting one or more incremental queries to the relational database, wherein the incremental queries are based on changes to the relational database; determining from the results of the queries one or more edges in the XML tree to be removed; determining from the results of the queries one or more edges in the XML tree to be inserted; inserting the edges; determining one or more new subtrees to be created under the inserted edges; and inserting the subtrees.

In a reduction approach, a method comprises the steps of determining one or more relational views based on a structure of the XML view; providing the one or more relational views to be applied to the relational database; obtaining one or more changes to the relational view in response to updates to the relational database; and using the one or more changes to the relational view to update the XML tree.

A more complete understanding of the present invention, as well as further features and advantages of the present invention, will be obtained by reference to the following detailed description and drawings.

BRIEF DESCRIPTION OF THE DRAWINGS

FIG. 1 is a diagram illustrating the incremental evaluation of an ATG where changes $\Delta T$ are applied to an XML view T;

FIG. 2 provides an exemplary DTD $D_0$ for an illustrative college registrar example;

FIG. 3 illustrates an exemplary XML view conforming to the DTD $D_0$ of FIG. 2;

FIG. 4 illustrates an ATG $\sigma_0$ that defines the XML view described for the example of FIG. 2;

FIG. 7 illustrates the definition of two attribute-relation generating queries when the resulting construction is applied to the ATG $\sigma_0$ of FIG. 4;

FIG. 8 illustrates two edge-relation generating queries derived from the ATG $\sigma_0$ of FIG.4;

FIG. 9 illustrates a technique for incremental evaluation of recursive schema with the reduction approach of the present invention;

FIG. 10 is a schematic block diagram of an exemplary middleware system 1000 based on the bud-cut incremental evaluation approach of the present invention;

FIG. 11 illustrates an incremental query for the bud generation phase of FIG. 10;

FIG. 12 illustrates an incremental query for the bud completion phase of FIG. 10;

FIG. 13 illustrates exemplary pseudo-code for an algorithm eval that implements the bud completion phase of FIG. 10; and FIG. 14 provides a further detailed example of the reduction mechanism.

DETAILED DESCRIPTION

Figure 5:
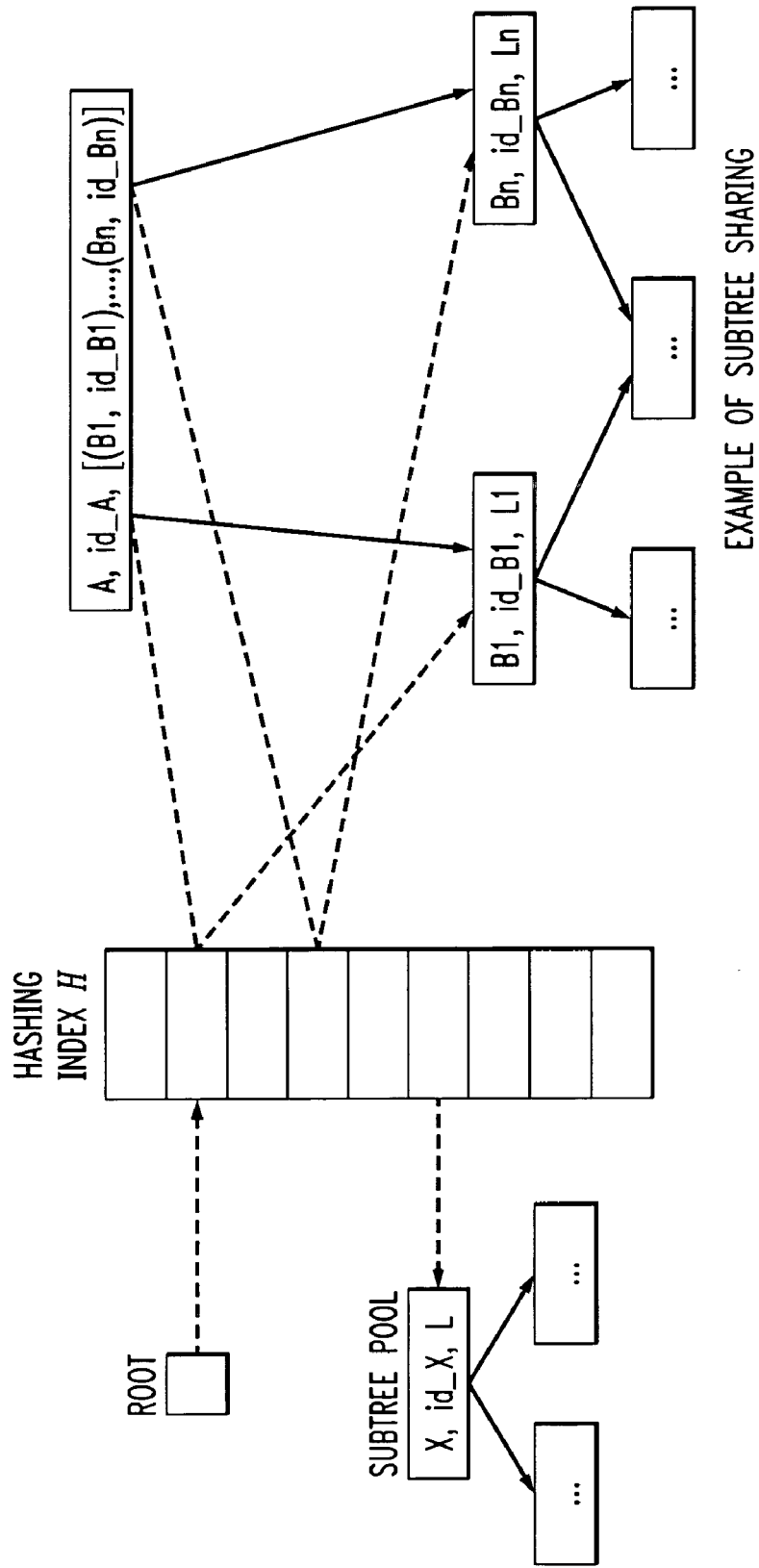
FIG. 5 illustrates the external data structures used to represent an XML document by a middleware system.

The present invention considers incremental updates and it is assumed that a set of changes to an XML tree T can be encapsulated as $\Delta T$, and that an operator $\oplus$ represents the application of these updates. Given these assumptions, the incremental evaluation problem for ATGs can be stated as follows: given an ATG, $\sigma$: R→D a relational instance I of R, the XML view T=$\sigma$(I), and changes $\Delta I$ to I, compute XML changes $\Delta T$ to T such that T$\oplus\Delta T$=$\sigma$(I$\oplus\Delta I$). These relationships are illustrated in FIG. 1. It is further noted that, if $\sigma$ is correct, T$\oplus\Delta T$ is trivially guaranteed to conform to the pre-defined DTD D. In contrast to fully recomputing the new view, incremental evaluation of ATGs can, in principle, improve performance substantially by applying only the changes $\Delta T$ to the old view T The present invention provides a) an efficient algorithm that computes the XML changes $\Delta T$ in response to relational changes $\Delta I$, and b) an efficient implementation of the tree-update operator $\oplus$.

According to one aspect of the invention, a reduction framework is provided for incremental maintenance of XML views defined by ATGs. For a given ATG definition $\sigma$, the framework consists of a) a set of virtual relations associated with the semantic attributes of $\sigma$, b) queries defining the recursive relationship of these virtual relations to encode ATG-produced XML documents, c) a mapping based on these recursive queries from ATGs to SQL 99 queries with linear recursion, and d) mechanisms for computing XML changes $\Delta T$ from relational changes $\Delta I$ and for updating the external view T with $\Delta T$.

According to another aspect of the invention, the reduction framework pushes work to the Database Management System (DBMS), thereby taking advantage of sophisticated capabilities for query optimization, execution and incremental view update, along the same lines as the design principles for systems to publish relational data as XML. However, three practical issues complicate the use of DBMS resources in support of incremental work. The first issue involves the DBMS features required for the reduction approach. Ideally, middleware should take a "lowest common denominator" approach to allow it to work with as many of the thousands of products supporting an Open Database Connectivity (ODBC) interface as possible. But instead, SQL 99 recursion and incremental update of views are separate, advanced features of only the most sophisticated commercial products. Yet the reduction approach depends on incremental update of materialized views defined using SQL 99 recursion; in other words, a combination of both features.

Second, to effectively push down the work required to incrementally update an external view, one must have access not only to a materialized view, but more importantly, to a stream of updates to that view. One way to obtain this functionality would be to define insert, update and delete triggers on the materialized view, but this is disallowed by at least one commercial DBMS with materialized view support, and need not be supported in general for the DBMS to function well. Finally, if the publishing queries are even mildly complex, the combined recursive queries may become extremely complex. As a result, they may not be effectively optimized by all platforms supporting with . . . recursive for the same reasons that not all DBMS platforms can effectively optimize complex non-recursive publishing queries.

In response to this, another aspect of the invention provides an alternative approach, referred to as the bud-cut approach to incremental ATG evaluation, that requires less sophistication from the DBMS. Further, certain optimization techniques are developed that capitalize on the tree-structure of XML views. The bud-cut mechanism propagates relational changes to XML in three phases: a bud-cut generation phase that determines the impact of $\Delta I$ on existing parent-child relations in the XML view by evaluating a fixed number of incremental-ized SQL queries, and a bud completion phase that iteratively computes newly inserted subtrees top-down by pushing SQL queries to the relational engine. Finally, deleted subtrees are removed by a garbage collection process.

The disclosed bud-cut approach has several properties. First, the bud-cut approach computes $\Delta T$ in parallel with the updating process of T with $\Delta T$; specifically, each iteration in the generation phase computes $\Delta T$ to a certain depth below newly added buds, and thus partial results of the new XML view can be returned to the users before the computation of $\Delta T$ is completed; this allows lazy evaluation that overlaps the view update process with client access. Second, the bud-cut approach minimizes unnecessary recomputations via a caching strategy not considered in prior work for maintaining recursive views, such that each new subtree in the XML view is computed at most once no matter how many times it occurs in the XML view, and furthermore, the computation maximally reuses subtrees of the old XML view. Third, the bud-cut approach incorporates optimization techniques that have proved effective in XML publishing but are not supported by DBMS, e.g., query merging. Fourth, the bud-cut approach does not require materialization of the view in the DBMS. Finally, the bud-cut approach does not require the DBMS to support either SQL 99 or incremental view updates.

Running Example and Schema-Directed Publishing Terminology

In a first example, a registrar database specified by the relational schema $R_0$ below (with keys underlined) may be expressed as:

course (<u>cno</u>, title, dept), project(<u>cno</u>, title, dept)
student(<u>ssn</u>, name), enroll(<u>ssn,cno</u>),
prereq(<u>cno1,cno2</u>).

The database maintains student data, enrollment records, course data classified into regular courses and projects, and a relation prereq, which gives the prerequisite hierarchy of courses where a tuple (ci, c2) in prereq indicates that c2 is a prerequisite of c1.

The office of registrar maintains an XML view for the Computer Science (CS) department, which contains data of CS courses registration, extracted from the registrar database. The view is required to conform to the DTD $D_0$ 200 shown in FIG. 2 (the definition of elements whose type is PCDATA is omitted).

An XML view 300 conforming to the DTD $D_0$ of FIG. 2 is depicted in FIG. 3. The XML view 300 consists of a sequence of course elements, which represent all the CS courses and projects. Each course has a cno (course number), a course title, a type indicating whether it is a course or project, a prerequisite hierarchy, and all the students who have registered for the course.

The source registrar database is updated constantly. Examples of (group) updates include: (1) insertion of a new CS course to the course relation, along with insertions of its prerequisites to prereq and insertions to enroll for the students who have enrolled in the course, (2) deletion of a CS course from the course relation, along with deletions from prereq and enroll accordingly, and (3) updates of the name fields of some student tuples.

As discussed more fully below, the XML view 300 can be defined with an ATG that guarantees the view 300 to conform to $D_0$. Incremental evaluation of the ATG is to update the materialized XML view 300 in response to updates to the source registrar database. Note that since the ATG is defined on a recursive DTD, relational updates may cause insertions, deletions and structure changes at an arbitrary depth of the XML view, which cannot be decided at compile time.

DTDs

Without loss of generality, a DTD D is formalized as (E, F, r), where E is a finite set of element types; r is in E and is called the root type; P defines the element types: for each A in B, P(A) is a regular expression of the form:

$$\alpha ::= str | \epsilon | B_1, \ldots, B_n | Bi+ \ldots +B_n | B^*$$

where $\epsilon$ is the empty word, B is a type in E (referred to as a child type of A), and '+', ',' and '*' denote disjunction, concatenation and the Kleene star, respectively ('+' is used instead of '|' to avoid confusion). Thus, there are 5 categories or cases of element types, P (also referred to herein as the various "forms" of $\alpha$). A→P(A) is referred to as the production of A. A DTD is recursive if it has an element type that is defined (directly or indirectly) in terms of itself.

It has been shown that all DTDs can be converted to this form in linear time by introducing new element types and performing a simple post-processing step to remove the introduced elements. To simplify the discussion, XML attributes are not considered, which can be easily incorporated.

An XML document (tree) T conforms to a DTD D, if (1) there is a unique node, the root, in T labeled with r; (2) each node in T is labeled either with a type A $\in$ E, called an A element, or with str (a string), called a text node; (3) each A element has a list of children of elements and text nodes such that they are ordered and their labels are in the regular language defined by P(A); and (4) each text node carries a string value (str) and is a leaf of the tree.

ATGs

The idea of attribute translation grammars (ATGs) is to treat the DTD as a grammar and recursively fire productions from the grammar to create an XML document. The syntax and semantics of ATGs is briefly reviewed.

An ATG σ:R→D specifies a mapping from instances of the source relational schema R to documents of the target DTD D as follows. First, for each element type A of D, σ defines a semantic attribute U whose value is a single relational tuple of a fixed arity and type; intuitively, $A is used to pass data downward and to control the generation of A elements in the XML view. Second, for each production p=A→α in D, σ specifies a set of semantic rules, rule (p). These rules specify the computation of the B children of an A element for each type B in α.

Given a database I of R, the ATG σ is evaluated top-down starting at the root r of D. A partial tree T is initialized with a single node of type r, and this node is marked unexpanded (unexpanded nodes are referred to as buds). The tree T is then grown by repeatedly selecting a bud b (of some element type A), evaluating the semantic rules associated with A, and marking b expanded. Specifically, the production p=A→α is found in D, and the children of b are generated by evaluating rule (p) and using the value of the attribute $A of b. The rules rule(p) are defined and evaluated based on the form of α as follows:

(1) If α is $B_1, \ldots, B_n$, then a node tagged $B_i$ is created for each i$\in$\{1, n\} as a child of b. The tuple value of $B_1$ associated with the new $B_i$ child is determined by projection from $A. That is, $B_i$=($A.\alpha_i^1, \ldots, $A.a_i^k$) is in rule (p) for i$\in$\{1,n\}, where $a_i^j$ is a field of the tuple $A.

(2) If α is $B_1$+ ... +$B_n$, then rule (p) is defined by ($B_1$, $B_2$, ..., $B_n$)=Case f($A) of 1: ($A, null, ..., null)

...

n: (null, ..., null, $A)

where $f$ is a function that maps U to natural numbers in $\{1, n\}$. That is, based on the conditional test, a node is created for exactly one child, $B_i$. The value of the parent attribute $A is passed down to that child. No $B_j$ child is created if i$\neq$j, and $B_j$, (the special value null) is ignored. It is assumed that the function f is simple enough to determine whether it is in the range $\{1, n\}$.

(3) If α is B*, then rule(p) is defined by $B←Q($A), where Q is an SQL query over a database of R, and it treats $A as a constant parameter. For each distinct tuple t returned by Q($A), a B child is generated, carrying t as the value of its $B attribute. To help ensure that only finite documents are created, only references to attributes and constants, but not expressions, are allowed in the select-list of Q.

(4) If α is str, then the rule specifies formatting of the values of $B for presentation (string/PCDATA). Such rules are not shown or discussed further herein.

(5) If α is e, then no rule is defined and no action taken.

The element children of the bud b are marked unexpanded and also processed. The process proceeds until the partial tree cannot be further expanded, i.e., it has no unexpanded node. The fully expanded XML tree does not include attribute values U, which are only used to control the tree generation.

In a second example, the ATG $\sigma_0$ 400 given in FIG. 4 defines the XML view described in the first example. Generally, the ATG $\sigma_0$ 400 defines a number of queries, $Q_1$ through $Q_3$, to be applied to the source data to obtain instances of the various tree elements. It is noted that statements of the form "$course←Q1" indicates that $course is assigned the results of query Q1. For example, query $Q_2$ obtains only prerequisites for a given course from the source data. Here, rule (course), rule(type) and rule(prereq) illustrate the "α form" cases (1), (2), (3) above. Given a registrar database, $\sigma_0$ computes an XML view as follows. The ATG $\sigma_0$ first generates the root element (with tag db), and then evaluates the query $Q_1$ to extract courses and projects of the CS department from the underlying database. For each distinct tuple c in the output of $Q_1$, the ATG $\sigma_0$ generates a course child $v_c$, of db, which carries c as the values of its attribute $course. The subtree of the course node $v_c$, is then generated by using c. Specifically, the ATG $\sigma_0$ creates the cno, title, type, prereq and takenBy children of $v_c$, carrying c.cno, c.title, c.tag, c.cno and c.cno as their attributes, respectively. The ATG $\sigma_0$ then proceeds to create a text node carrying c.cno as its PCDATA, as the child of the cno node; similarly for title. The ATG $\sigma_0$ then determines the type of $v_c$ by examining c.tag: if it is 1 then a regular child of type is created; otherwise a project child is generated.

It creates the children of the prereq node by evaluating the SQL query $Q_2$ to find prerequisites of the course, and again for each tuple in the output of $Q_2$ it generates a course node; similarly it constructs the takenBy subtree by evaluating $Q_3$ to extract student data. Note that $Q_2$ and $Q_3$ take c.cno as a constant parameter. Since course is recursively defined, the process proceeds until it reaches courses that do not have any prerequisites, i.e., when $Q_2$ returns empty at the prereq children of those course nodes. That is, ATGs handle recursion following a data-driven semantics. When the computation terminates, the ATG generates an XML view as depicted in FIG. 3, which conforms to the DTD $D_0$ given in the first example.

Exception Handling—ATGs, as defined herein, refine the original definition introduced in Benedikt et al. An ATG of Benedikt et al. may abort over a relational database, i.e., it may terminate unsuccessfully as the XML view it generates may violate the given DTD. In contrast, the disclosed revised ATGs do not abort. However, even the disclosed revised ATGS defined over a recursive DTD may not terminate. For example, $\sigma_0$ of FIG. 4 may not converge if the relation prereq in the underlying database is cyclic, e.g., if a course is its own prerequisite. Worse still, it is undecidable to determine at compile time for an arbitrary ATG $\sigma: R \rightarrow D$, whether a terminates on all databases of R.

To cope with this, an exception handling mechanism is introduced. For an element type A defined recursively, a mild extension of its production $p = A \rightarrow \alpha$ is considered, namely, $p' = A \rightarrow \alpha + str$. For example, the production of course is extended in the DTD $D_0$ to be:

course $\rightarrow$ (cno, title, type, prereq, takenBy)+str

In order to ensure termination, tree generation is modified to stop expanding the tree if a newly created node lv has the same type and semantic attribute value as one of its ancestors, v. In this case, the string value of lv's attribute is emitted as the contents of the new node. It should be mentioned that this does not lose information, since the sub-tree of lv, if constructed by following the original production $p = A \rightarrow a$, is just a copy of the subtree at v and does not introduce any new information. This process is referred to as exception handling. Although exception handling slightly modifies the DTD embedded in an ATG, it ensures termination of ATG evaluation without loss of information.

Theorem: Let $\sigma: R \rightarrow D$ be an arbitrary ATG with exception handling. Then over all instances I of R, $\sigma$ terminates and $\sigma(I)$ conforms to the DTD D.

This theorem shows that an ATG $\sigma: R \rightarrow D$ is actually a total function: given a database I of R, $\sigma(I)$ computes an XML document of D that is unique up to reordering of B-elements produced by—productions of the form $A \rightarrow B^*$.

External Trees

Incremental update applies in the context of an externally maintained tree available to the client. While the present invention is illustrated using an in-memory tree in C++, the proposed data structures and algorithms apply to other implementations, as would be apparent to a person of ordinary skill in the art.

A number of external data structures are maintained by the disclosed middleware system 900, discussed below in conjunction with FIG. 9, that manages the external view to accept and process changes.

Node Identity—It is assumed that a compact, unique value can be associated with each tuple value taken on by a semantic attribute in $\sigma(I)$. It is assumed, without loss of generality, that the existence of a Skolem function gen_id that, given the tuple value of a semantic attribute $A, computes id_A that is unique among all identities associated with all semantic attributes (for example, it might encode the type and a unique value within that type).

Tree versus Graph Representations—An important property of an ATG $\sigma: R \rightarrow D$ is that, for any database I of R and type A of D, an A-element (subtree) $T_A$ in the XML view $a(I)$ is uniquely determined by the value of the semantic attribute $A at the root of $T_A$. Thus, the ATG defines a function ST such that, given a element type A and a value t of $A, ST(A, t) returns a subtree rooted at a node tagged A and carrying t as its attribute.

Since a subtree ST(A, $A) may appear at different places in the XML view $\sigma(I)$, if the middleware system 900 is managing the external view, it may be more efficient to represent $\sigma(I)$ as a graph such that a single copy of ST(A, U) is stored and shared by its multiple occurrences. Indeed, if $\sigma(I)$ is stored as a tree, for example, by using an available implementation of DOM (see, e.g., V. Apparao et al., Document Object Model (DOM) Level 1 Specification, W3C Recommendation, October 1998), the tree may be exponentially larger than the graph representation. In light of this, the current implementation of ATGs adopts the graph representation, but supports client navigation on the graph as if it were a tree. The trade-off of the space efficiency is that the support of user navigation is complicated, as the path from a particular node to the root of the tree would be dependent on the route navigated; further, a mechanism must be provided to check for duplicates along this path to provide the exception handling semantics described above.

Data Structures—FIG. 5 illustrates the external data structures used to represent an XML document by a middleware system. The tree T is stored in a hash index H and a subtree pool S. Each entry of H is of the form (A, id_A, ptr), where A is an element type, id_A is the unique id of a value of SA, and ptr is a pointer to the root node of the subtree ST(A, $A) in S. The subtree pool S consists of entries (A, id_A, L), where (A, id_A) represents a node v of T, and L is a list $\{(B_1, id\_B_1), \ldots, (B_n, id\_B_n)\}$ representing the children of v such that each $(B_i, id\_B_i)$ is an entry in H. It is observed that in the graph representation, there is a one-to-one mapping from H entries to the nodes in S.

Handling Updates—As used herein, $\Delta T$ can be any group of updates to the underlying DBMS that preserves the consistency of the database (integrity constraints). XML updates $\Delta T$ generated from $\Delta T$ by one of the techniques described in the next two sections are represented as $(E^+, E^-)$, where $E^+$ is a set of edges to be inserted into the tree T, and $E^-$ is a set of edges to be deleted from T. The edges are represented as (id_A, id_B), where id_A and id_B are the ids of the parent A-element and the child B-element, respectively.

The system processes insertions as follows: for each tuple (id_A, id_B) in $E^+$, 1) find the H entry (A, id_A) and the pointer to the node (A, id_A, L) in the subtree pool S; 2) insert (B, id_B) into L if it is not already in L; and 3) if H does not have an entry (B, id_B) in H, create an entry in H and a node (B, id_B, { }) in S with an empty child-list { }. Note that if there is already an entry (B, id_B) in H, the new edge is actually a cross edge to the existing B node. A subtle issue concerns the order of the children list L when a B node is inserted into L. Note that L is constrained by the production $A \rightarrow \alpha$: if $\alpha$ is $B_1, \ldots, B_n$, the elements of L are in the same order as their element types in the production; and if a is $B^*$, L elements are ordered by a default order on the tuple values of the $B attributes of these elements.

The system carries out deletions similarly: for each tuple (id_A, id_B) in $E^-$, 1) find the node (A, id_A, L) in the subtree pool via the H-index entry H(A, id_A), and 2) cuts the edge (id_A, id_B) by removing id_B from the children list L. It should be noted that during the processing of relational updates ΔT, no entries are physically deleted from H because a) an entry may be shared by multiple subtrees of T, and b) as will be seen shortly, the disclosed incremental system minimizes unnecessary recomputations by reusing subtrees that have been disconnected from the tree by cuts.

Garbage Collection—Upon the completion of the computation of the new XML view $\sigma(I \oplus \Delta I)$, a garbage collection process runs in the background to remove H-entries and nodes in the subtree pool that are not linked to $\sigma(I \oplus \Delta I)$. Conceptually, this can be done via a top-down traversal of the new XML tree, removing nodes that are no longer reachable from the root. In the exemplary implementation, a count is associated with each H-entry keeping track of the number of nodes linked to it, and the counters are maintained when processing insertions and deletions; the garbage collection process removes unused nodes, i.e., those H-entries with count equal to 0 and their corresponding nodes in the subtree pool.

Pushing Incremental Work to the DBMS (Reduction Approach)

The reduction approach is based on 1) a relational encoding of XML trees via a set of (interrelated) virtual attribute and edge relations, and 2) a translation of an ATG $\sigma$: R→D to a set $MQ_\sigma$ of SQL 99 queries utilizing the with ... recursive construct, which computes the attribute and edge relations of the XML views defined by $\sigma$.

Figure 6:
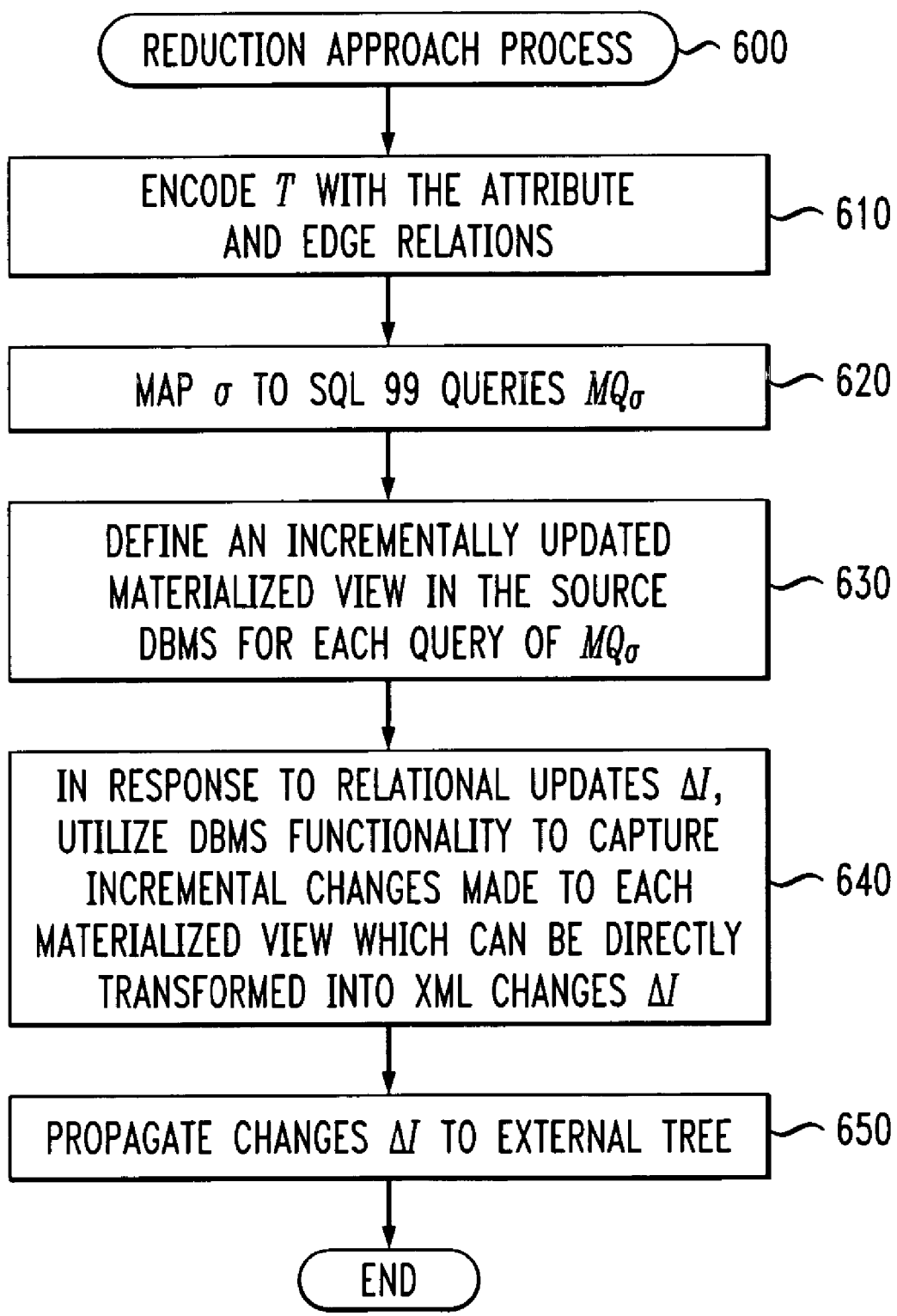
FIG. 6 is a flow chart describing an exemplary implementation of a reduction approach process 600 incorporating features of the present invention.

FIG. 6 is a flow chart describing an exemplary implementation of a reduction approach process 600 incorporating features of the present invention. As shown in FIG. 6, the reduction approach 600 to incrementally maintaining an XML tree T computed by ATG $\sigma(I)$ works as follows: 1) encode T with the attribute and edge relations during step 610, 2) map $\sigma$ to SQL 99 queries $MQ_\sigma$ during step 620, 3) define an incrementally updated materialized view in the source DBMS for each query of $MQ_\sigma$ during step 630, 4) in response to relational updates ΔI, utilize the DBMS functionality to capture the incremental changes made to each of the materialized views which can be directly transformed into the XML changes ΔI (i.e., $E^+$ and $E^-$) during step 650, and 5) propagate the changes ΔI to the external tree during step 660, as described in the previous section. This leads to a convenient approach to incremental evaluation of ATGs by pushing as much work as possible to the underlying DBMS.

Relational Encoding of XML Trees

As previously indicated, an XML view $\sigma(I)$ is encoded during step 610 (FIG. 6) via node (semantic attribute) and edge relations.

Attribute Relations—The attribute relations are to capture the values taken on by the semantic attributes defined in a(I). To avoid confusion, "attributes" of relational tables will be uniformly referred to as "columns."

Recall that $\sigma$ associates with each element type B a tuple formatted variable $B. For each such variable $B, let gen_B be a relation with columns matching the arity and type of $B, along with a column for id_B if an existing group of attributes does not serve this role. Further, in the context of a database instance I, assume that gen_B is populated with all the (non-null) values taken on by $B during an evaluation of $\sigma$ on I.

Each attribute relation, gen_B, is defined in terms of a query $Q_{gen\_B}$ involving the other attribute relations and the relations of I. To define $Q_{gen\_B}$, SQL queries embedded in $\sigma$ are rewritten to queries that take gen_A, instead of a single tuple $A, as a parameter. Specifically, consider productions A→α in which B appears on its right-hand side (RHS).

(1) For productions of the form A→B* with associated semantic rule $B←Q($A), gen_B is the union, over all values of $A in gen_A, of Q($A). In a manner similar to the level-at-a-time processing of Benedikt et al., this query can be rewritten as Q', which takes no parameters but additionally accesses gen_A. This is accomplished, roughly, by a) adding gen_A to the from list of Q, and b) replacing references to $A in Q with the corresponding references to gen_A.

(2) If B appears as some $B_1$ when α is $B_1, \ldots, B_n$, then Q' is a simple selection query from gen_A that projects fields according to $f_i$ (SA) (see the section entitled "Running Example and Schema-Directed Publishing Terminology").

(3) If B appears as some $B_i$ when α is $B_i + \ldots + B_n$, then Q' can be written as select * from gen_A α where $f(\alpha)=i$. Note that it is assumed further that $f(\alpha)$ is computable in the dialect of SQL used to express Q'.

It is now simple to generalize this construction to handle the case where B appears on the RHS of multiple rules in $\sigma$. Suppose that it appears on the RHS of rule $p_1, p_2, \ldots, p_n$, and that $Q'_i$ is defined according to the discussion above. Then $Q_{gen\_A}$ is formed by taking the (distinct) union of all $Q'_i$ queries.

For example, FIG. 7 shows the definition of two attribute-relation generating queries 700 when the resulting construction is applied to the ATG $\sigma_0$ of FIG. 4.

The set of-all $Q_{gen\_x}$ queries for $\sigma$ is denoted by AR($\sigma$).

Maintaining Edges—Edge relations of the XML view are captured as follows. Let edge_A_B be a relation with two columns, id_A and id_B. Such a relation is created if B appears on the RHS of some production for A. The Skolem function gen_id described in the section entitled "External Trees," is overloaded to compute the unique id ia from a relational tuple a.

Queries to define these edge relations are derived in terms of attribute relations and base relations. As before, consider first productions of the form A→B*, where $B←Q($A) is the associated semantic rule. In this case, edge_A_B is the set of pairs (ia, ib) such that a ∈ gen_A and b ∈ Q(a), where ia=gen_id(a) and ib=gen_id(b). To derive a query $Q_{edge\_A\_B}$ for an edge relation edge_A_B, the same rewriting as for the attribute relations can be employed, with the following change: the select list of the attribute relation is replaced with (ia, ib). The definition of $Q_{edge\_A\_B}$ is similar for productions of other forms.

The set of all $Q_{edge\_A\_B}$ queries for $\sigma$ is denoted by ER($\sigma$).

For example, FIG. 8 shows two edge-relation generating queries 800 derived from the $\sigma_0$ ATG of FIG. 4.

Computing Attribute and Edge Relations with SQL 99 Linear Recursion

As the running example illustrates, the attribute relations are potentially mutually recursive, and the edge relations depend on the attribute relations. Furthermore, each attribute relation can be related to itself and other attribute relations through a variety of paths, raising the possibility that concluding evaluation of updates to the attribute relations will be excessively complex. Fortunately, this is not the case.

While the attribute relations are recursive, there are substantial constraints on this recursion. Consider the references in the query Q_gen_A to other attribute relations B, C, . . . . First, observe that such a relationship cannot be made via negation (in the Datalog sense), that is, the reference to B cannot appear in a not exists clause in Q_gen_A. Second, note that references to two different attributes relations, for example, B and C, must be made in two different sub-queries of Q_gen_A, such that these sub-queries are joined only by the top-level union operator introduced by the construction.

Finally, since expressions are not allowed in the select clauses of view-definition queries, aggregate expressions which depend on attribute relations will not appear.

Given these restrictions, the computation of the attribute or edge relations (or both) can be accomplished with the SQL 99 with . . . recursive construct. Let $Q_\sigma$ be a set of edge and attribute relation-generating queries from σ which either includes all of the attribute relations or all of the edge relations. Let $G_Q$ be a graph in which there is a node for each query in $Q_\sigma$ and an edge from $Q_B$ to $Q_A$ if and only if $Q_B$ refers to the virtual relation gen_A in the from clause. Let $c^0{}_1, \ldots, c^0{}_n$ be the connected components of this graph. Components are now merged and possibly recursive queries are generated, along the same lines as R. Krishnamurthy et al., "Recursive XML Schemas, Recursive XML Queries, and Relational Storage: XML-to-SQL Query Translation," ICDE (2003) (hereinafter, referred to as Krishnamurthy et al.).

First, singleton components with only a single incoming edge are merged with the source component. Let the result of this process be $c_1, \ldots, c_n$. For each such component $c_i$, if it is acyclic, then a set of merge-queries, $MQ_{ci}$, for the component can be defined. The number of queries produced will depend on the choices made for query merging, and DAG structures can be handled with an embedded with clause as suggested by Krishnamurthy et al.

If the component is cyclic, a single recursive query $MQ_{ci}$ is defined to compute the outer union of all the virtual relations in ci with the following steps:

(1) The schema of $MQ_{ci}$ is the union of all columns appearing in any query of $c_i$ plus an additional srel attribute intended to encode which virtual relation a given tuple in $MQ_{ci}$ represents.

(2) The initial condition for $MQ_{ci}$ is the union of the queries for nodes with edges incident on $c_i$ in $G_Q$.

(3) The query $MQ_{ci}$ is the union of all of the queries of ci. In each sub-query, if a mention to a virtual attribute relation gen_A appears, it is replaced with a reference to $MQ_{ci}$ and a conjunctive condition is added to the where clause to ensure that srel="A"; similarly for edge relations.

Applying this algorithm to the ATG of FIG. 4, two components are obtained after merging. One component consists of $Q_{edge\_course\_rereq}$ and $Q_{edge\_prereq\_course}$, and is shown as the linear-recursive QC2 in FIG. 9. All the remaining queries are in the query QC1, which is not recursive.

The set of queries $MQ_{ci}$ generated for an ATG σ is referred to as $MQ_\sigma$. It is easy to verify the correctness of the mapping: for any ATG σ: R→D and any relational instance I of R, $MQ_\sigma$.(I) computes gen_A and edge_A_B for all attributes \$A and parent-child edges (\$A, \$B) in the XML view σ(I).

In response to relational updates ΔI, each edge relation edge_A_B defined by SQL 99 queries $MQ_\sigma$ is updated via insertions and deletions. Insertions and deletions over all edge relations are collected into two sets E⁺ and E⁻, respectively. The two sets E⁺ and E⁻ are sent to the middleware maintaining the external tree, as described in the previous section. As mentioned in the introduction, this approach assumes that the underlying DBMS incrementally computes edge changes E⁺ and E⁻ and further that these incremental changes can be captured, for example with triggers.

Bud-Cut Incremental Evaluation

As previously indicated, the reduction approach may not be practical for middleware-based XML publishing since it depends on a combination of features not yet found in even the most advanced commercial DBMSs, while middleware should depend on only the most common features. This observation motivates the proposed bud-cut approach to incrementally evaluating ATGs σ: R→D, which does not require the underlying DBMS to support with . . . recursive.

A middleware system 1000 based on the bud-cut mechanism is depicted in FIG. 10. The system 1000 interacts with an underlying DBMS 1010 and maintains a hash index H and a subtree pool 1020 for the external XML view T (σ(I)) as described above. The middleware system 1000 responds to a relational, update ΔI in three phases. The first phase, bud-cut generation 1030, identifies the portions of the existing tree that will be affected by the updates ΔI, and propagates ΔI to XML changes to the existing nodes in T. Nodes created in this phase are buds, i.e., they are marked unexpanded. The second phase, bud completion 1040, constructs subtrees under buds, taking advantage of ATG properties to avoid recomputation and reusing existing subtrees when possible. The third phase, garbage collection (not specifically shown in FIG. 10), runs after bud completion is finished and removes unreachable subtrees.

While requiring several round-trips between the middleware 1000 and the DBMS 1010, this approach is able to exploit other optimizations by taking advantage of the specifics of ATG semantics and XML views. In particular, as observed above, since the value of a subtree, ST(A, t), is determined by the tuple value t of the semantic attribute of the subtree's root node, changes to the children of the existing nodes in the tree can be computed by a fixed set of non-recursive queries. Furthermore, any new subtree ST(A, t) can be reused and thus needs to be computed at most once. In addition, the bud-cut approach allows the update process of the external tree T to run in parallel with the computation of XML changes ΔI, thus improving the response time. This last point leads to a variety of options for lazy evaluation of incremental updates. That is, the middleware system 1000 can optionally defer complete processing of updates until the subtrees affected by those updates are accessed. When the external view is materialized as an in-memory tree, it is possible to support tree navigation concurrent with processing.

Implementation of Delta SOL Queries

Assuming these relations, the first step is to derive two sets of incremental (nonrecursive) SQL queries from edge-generating queries ER(σ). These two forms of incremental queries will be used in the bud-cut generation phase 1030 and the bud-completion phase 1040, respectively.

Incremental queries of the first form are derived as follows. For each query $Q_{edge\_A\_B}$ in ER(σ), a bud generating query is defined, formed by adding all the columns of the attribute SB to the select list of $Q_{edge\_A\_B}$. An incremental form of this bud-generating query, $\Delta Q_{edge\_A\_B}$, is then created by using a counting method like A. Gupta et al., "Maintaining Views Incrementally," SIGMOD (1993) (hereinafter, Gupta et al.).

Since the method of Gupta et al. is assumed to execute in the DBMS 1010, it assumes access to both I and I⊕ΔI. However, the disclosed middleware system 1000 is separate from the DBMS 1010 and can only access I⊕ΔI. To find I, for a given relation, $R_i$, the existence of a change table $\Delta I_i$ is assumed that holds ΔI restricted to $R_i$ as well as a count cnt with the value either "+1" or "−1" to indicate an insert or delete, respectively. Further, it is assumed that $\Delta I_i$ has already been applied to $I_i$, the instance of $R_i$ in I. In order to simulate the pre-image of $I_i$, a view old_$R_i$ is defined for each relation $R_i$ ∈R, which simply selects tuples of $I_i$ that do not appear in $\Delta I_i$. It can be implemented efficiently if $\Delta I_i$ is small and is indexed on the key of $R_i$.

For example, FIG. 11 gives the incremental bud-generating query for edge_prereq_course, which is derived from the query $Q_{edge\_prereq\_course}$ by using the counting method of Gupta et al. in response to changes $\Delta_{course}$ and $\Delta_{prereq}$. Observe that in addition to edges of edge_A_B, the query also returns the corresponding $B values. A query $\Delta Q_{edge\_A\_B}$ is typically a union of several queries each incorporating the effects of changes in one of the base relations referenced by $\Delta Q_{edge\_A\_B}$.

Incremental queries of the second form are a mild extension of ER(σ). For each $Q_{edge\_A\_B}$ in ER(σ), an incremental bud-completing query $\Delta Q_{edge\_A\_B}^{Bud}$ (Bud$_A$) is defined to compute changes to edge_A_B in response to a set Bud$_A$ of insertions to the attribute relation gen_A. The query is derived from $Q_{edge\_A\_B}$ by substituting Bud$_A$ for gen_A and by adding all the columns of the attribute $B to the select list of $Q_{edge\_A\_B}$. It computes the edges of the newly inserted A-nodes in Bud$_A$. In contrast to the incremental bud-generating query $\Delta Q_{edge\_A\_B}$, the incremental query $\Delta Q_{edge\_A\_B}^{Bud}$ (Bud$_A$) takes Bud$_A$ as a parameter and does not access gen_A; furthermore, it uses the new relation I⊕ΔI without requiring the old I. For example, FIG. 12 shows the incremental bud-completing query of Qedge_prereq_course, which assumes that course has been updated by Δcourse.

Bud-Cut Generation

Having derived the incrementalized SQL queries, this phase 1030 proceeds as follows:

(1) The incremental bud-generating queries $\Delta Q_{edge\_A\_B}$ are executed in the DBMS 1010, yielding changes to the edge relations: a set of insertions E$^+$ and deletions E$^-$.

(2) The sets (E$^+$, E$^-$) are transmitted to the middleware 1000 and posted against the tree T, as described above. Moreover, the $A-value of each new A-node added to T is also added to Bud$_A$, a set of buds of type A. An A-node is marked unexpanded if its $A value is in the Bud$_A$ set.

(3) If the attribute relations are materialized in the DBMS 1010, tuples in Bud$_A$ are sent to the DBMS 1010 and inserted into gen_A, for all element types A in the ATG.

It should be remarked that the bud-cut-generation phase 1030 updates the parent-child edges of all the existing nodes in the XML view T in response to relational changes ΔI. Thus, all the edge deletions are handled in this phase 1030, by evaluating the incrementalized SQL (bud-generating) queries of ER(σ) once. Note further that nodes disconnected by the edge cuts are not removed from the H-index or the tree but instead remain in the subtree pool 1020 pending reuse during bud generation. Garbage collection of the nodes that have been disconnected from the tree will be handled by a background process after the bud-completion phase 1040, as described above.

A complicated DTD may lead to a large number of incremental bud-generating queries. For a given small relational change ΔI, however, one only needs to evaluate those that refer to a relation affected by ΔI. Techniques, such as those described in A. Y. Levy and Y. Sagiv, "Queries Independent of Updates," VLDE (1993), for identifying queries irrelevant to ΔI can further reduce the number of bud-generating queries that need to be evaluated.

Example—Recall the ATG σ$_0$ defined in FIG. 4. Assume that an XML tree σ$_0$(I) of a registrar database I is maintained by the middleware 1000. Consider relational changes ΔI: deletion of a CS course from the course relation, along with deletions from prereq and enroll accordingly. Given this, the bud-cut generation phase 1030 computes only E$^-$, which consists of deletions of edges (db,course), (course,prereq), etc. These changes are made to the XML tree σ$_0$ (I) in this phase 1030. Note that no buds are generated, i.e., Bud$_B$ is empty for all B in the ATG. In other words, although the relational changes have impact to the XML tree at an arbitrary level, they are captured in the bud-cut generation phase 1030 by evaluating a fixed number of incrementalized SQL queries.

On the other hand, if ΔI is to update the name fields of some student tuples, then it involves both deletions and insertions, i.e., Bud$_{student}$ is nonempty and consists of student buds. The bud-cut generation phase 1030 handles deletions, and the next phase, the bud-completion phase 1040, proceeds to generate subtrees of new student buds.

Bud Completion

The previous bud-cut generation phase 1030 creates sets Bud$_A$ consisting of the $A-attribute values of new A-nodes for each element type A in the ATG, and the bud-completion phase 1040 is to produce the subtrees of these buds. The process may further generate new nodes, but does not incur deletions.

The processing of bud completion is conducted by Algorithm eval 1300, shown in FIG. 13. The algorithm 1300 takes Bud$_A$'s from the generation phase 1030 as input, and processes each non-empty Bud$_A$ based on the production p=A→a and its associated rule(p) (cases 1-4), generating children of these A-elements. For example, in case 3, the algorithm 1300 processes a given set Bud$_A$ as follows. It first finds the edges of the A nodes in Bud$_A$ that are to be inserted into edge_A_B, by evaluating the incremental bud-completing query $\Delta Q_{edge\_A\_B}^{Bud}$ (Bud$_A$) in the DBMS 1010. It then updates the children lists of these A nodes in the subtree pool T, taking advantage of the H-index and id_A. Then, for each B child id_B of such an A-bud id_A, it invokes the procedure process(B, id_B) to inspect whether there already exists an entry for the node (B, id_B) in the hash index H. If so, it simply adds a cross edge (id_A, id_B) instead of recomputing the subtree of (B, id_B); otherwise, it creates a new H-entry for (B, id_B) and adds the attribute value $B of id_B to Bud$_B$. This yields Bud$_B$, the set of new B-buds that will be further expanded at the next level of the tree. Note that to populate Bud$_B$ we need the attribute values $B of these newly inserted B nodes.

Observe the following properties of the eval algorithm 1300.

(1) At each iteration (level), any paths in the XML view that begin at the root and do not encounter a bud are guaranteed to be correct, and thus partial results of the new XML view a σ(I⊕ΔI) can be exposed to the users in parallel with the computation of ΔT.

(2) The eval algorithm 1300 minimizes unnecessary computations via the procedure process: it reuses subtrees that has been computed either by Algorithm eval or earlier for the old view σ(I). Thus, each bud is computed at most once. The reuse of the previous computations is possible since no nodes are removed from the H-index or subtree pool.

(3) The bud-completion phase 1040 does not need materialization of the attribute relations, since all the SA-values that $\Delta Q_{edge\_A\_B}^{Bud}$ needs are in Bud$_A$, not in gen_A. Note that only case (3) in the eval algorithm 1300 needs to access the DBMS.

(4) The procedure process is also a necessary step toward implementing exception handling described earlier. If a descendant lv of an A-node v with attribute value $A is also an A node with the same $A value, the node lv is not created since there is already an entry for (A, $A) in the H-index; instead, any edge to lv is treated as a cross edge and linked to v. As a result, the the eval algorithm 1300 always terminates.

Example—Consider again the ATG σ$_0$ and relational changes ΔI that update the name fields of some student tuples. The bud-cut-generation phase 1030 generates a set Bud$_{student}$ consisting of these updated student tuples, generates new student nodes for these tuples, and redirects affected edges to these new nodes. The bud-completion phase 1040 completes the subtree of these new students by creating new name fields and reusing social security number (ssn) fields for the students. This is done in one iteration of the outer loop of the eval algorithm 1300, although the students may appear at arbitrary level of the XML view.

Now consider changes ΔI consisting of insertion of a new CS course to the course relation, along with insertions of its prerequisites to prereq and insertions to enroll for the students who have enrolled in the course. The bud-cut-generation phase 1030 generates a set $Bud_{course}$ consisting of the newly inserted course tuple, creates a new node c representing the course, and adds an edge from the root db to c. The bud-completion phase 1040 takes $Bud_{course}$ as input and constructs the subtree of c. Since all the prerequisites of c are already in the XML view, the subtree of c can be completed in two iterations of the outer loop of the eval algorithm 1300. In the first iteration, only $Bud_{course}$ is nonempty, and the algorithm 1300 creates new cno, title, prereq, type and takenBy children of c. The second iteration completes their subtrees by reusing the existing course and student nodes. Since no new nodes are generated in the second step, the iteration terminates, although the subtree under c may have a depth greater than two due to its prerequisites hierarchy.

Implementation Issues

Overlapping Phases—While the first and second phase 1030, 1040 have been presented as completely separate, in practice it may be advantageous to "pipeline" them. In particular, consider the case where ΔI affects base tables for both $\Delta Q_{edge\_A\_B}$ and $\Delta Q_{edge\_B\_C}$. It makes sense to compute $\Delta Q_{edge\_A\_B}$ first, allowing the A nodes in the tree to be expanded and thus gen_B to be incremented before $\Delta Q_{edge\_B\_C}$ is executed. This follows the observation in Gupta et al. that incremental queries should be evaluated by "stratum number," which reflects dependency relationship.

Query Merging—It has been shown that query merging is useful for systems to publish relational data in XML. The idea is to reduce the number of queries issued to the DBMS by merging multiple queries into a single, larger query via outer-join/outer-union. Query merging can help decrease the communication costs between the middleware and DBMS, while also potentially diminishing query processing time and execution overheads.

The generation of subtrees under buds is similar to the original process of ATG generation (see, e.g., Benedikt et al.), and query merging can be used in the bud-completion phase 1040 to merge multiple edge-generating queries of the form $\Delta Q_{edge\_A\_B}^{Bud} (Bud_B)$ and $\Delta Q_{edge\_A\_B}^{Bud} (Bud_A)$ into one. However, the reuse of existing subtrees is an important difference, and direct application of the merging techniques for ATGs may lead to unnecessary recomputations. Consider an edge (a, b) generated by $\Delta Q_{edge\_A\_B}^{Bud}$. If node b already exists, then there is no need to recompute its subtree, and S should not be included in $Bud_B$ for the computation of $\Delta Q_{edge\_A\_B}^{Bud} (Bud_B)$. This can be avoided by adding a condition in the where clause of $\Delta Q_{edge\_A\_B}^{Bud} (Bud_B)$, ensuring that b is not already in gen_B. With this mild extension, one can use the cost model and merging algorithms of Benedikt et al. to determine what queries to merge before Algorithm eval is executed, and thus further optimize generation of subtrees under buds. The tradeoff is that the attribute relations need to be materialized in the DBMS.

FIG. 14 provides a further detailed example of the reduction mechanism. FIG. 14 illustrates the queries used to define the attribute relations, gen_X, for the types appearing in the DTD, D.

For a more detailed discussion of the incremental evaluation techniques described herein, as well as of experimental results of the disclosed incremental evaluation techniques, see P. Bohannon et al., "Incremental Evaluation of Schema-Directed XML Publishing," Proc. of the 2004 ACM SIGMOD Int'l Conf. on Management of Data, 503-14 (2004), incorporated by reference herein.

System and Article of Manufacture Details

The middleware system 1000 comprises a computer system that optionally interacts with the DBMS 1010. The exemplary middleware system 1000 comprises a processor, a network interface, a memory, a media interface and a display. Network interface optionally allows the middleware system 1000 to connect to a network, while media interface optionally allows the computer system to interact with media, such as a Digital Versatile Disk (DVD) or a hard drive. Optional video display is any type of video display suitable for interacting with a human user of the middleware system 1000. Generally, video display is a computer monitor or other similar video display.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for incremental update of an XML tree defined from a recursive XML view of a relational database, said method comprising the steps of:

obtaining a predefined recursive schema;

detecting at least one change to said relational database;

providing one or more incremental queries to said relational database to map said change to said relational database into changes to said XML tree, wherein at least one component of a definition of said one or more incremental queries is executed a plurality of times in traversing a path through said XML tree, wherein said incremental queries are based on said changes to said relational database; and applying said mapped change to said XML tree to incrementally generate said recursive XML view, wherein said recursive XML view conforms to said predefined recursive schema, wherein at least one of said steps is performed by at least one hardware device.

2. The method of claim 1, wherein said one or more incremental queries comprises a recursive query.

3. The method of claim 1, wherein said one or more incremental queries comprises a recursive sequence of non-recursive queries.

4. A method for incremental update of an XML tree defined from an XML view of a relational database, said method comprising the steps of:

obtaining a predefined schema;

submitting one or more incremental queries to said relational database, wherein said incremental queries are based on changes to said relational database;

determining from the results of said incremental queries one or more edges in said XML tree to be removed;

determining from the results of said incremental queries on one or more edges in said XML tree to be inserted;

inserting said edges;

determining one or more new subtrees to be created under said inserted edges; and inserting said subtrees tree to incrementally update said XML tree, wherein said XML view conforms to said predefined schema, wherein at least one of said steps is performed by at least one hardware device.

5. The method of claim 4, wherein said first determining step further comprises the step of disconnecting said one or more edges and corresponding subtrees to be removed from said XML tree.

6. The method of claim 5, further comprising the step of performing a garbage collection process on said one or more edges that have been disconnected from said XML tree and have not been reused.

7. The method of claim 4, further comprising the step of generating one or more subtrees associated with new nodes in said XML tree.

8. The method of claim 7, wherein partial results of a new XML view produced by said generating step can be provided to a user.

9. The method of claim 4, wherein one or more deleted subtrees are reused when inserting said new subtrees.

10. A method for incremental update of an XML tree defined from an XML view of a relational database, said method comprising the steps of:

obtaining a predefined recursive schema;

determining one or more relational views based on a structure of said XML view;

providing said one or more relational views to be applied to said relational database;

obtaining one or more changes to said relational view in response to updates to said relational database; and using said one or more changes to said relational view to incrementally update said XML tree, wherein said XML view conforms to said predefined recursive schema.

11. The method of claim 10, wherein said determining step further comprises the step of identifying portions of said XML view that are recursive and generating one or more corresponding recursive relational views.

12. The method of claim 10, wherein said using step further comprises the step of transforming said changes to said relational view to changes to be performed on said XML tree.

13. The method of claim 10, wherein said relational views are determined by:

separating recursive parts of said XML view definition from non-recursive parts;

producing one or more non-recursive views from each non-recursive part; and producing one recursive view from each recursive part.

14. The method of claim 13, wherein recursive parts of said XML view definition are separated from non-recursive parts by constructing a directed graph of view definition parts in which each part is a node, and an edge appears from one node to another node if the part associated with the second node refers to the part associated with the first node, and determining each recursive part to be a strongly connected component in said graph with more than one node.

15. An apparatus for incremental update of an XML tree defined from a recursive XML view of a relational database, the apparatus comprising:

a memory; and at least one processor, coupled to the memory, operative to:

obtain a predefined recursive schema;

detect at least one change to said relational database;

provide one or more incremental queries to said relational database to map said change to said relational database into changes to said XML tree, wherein at least one component of a definition of said one or more incremental queries is executed a plurality of times in traversing a path through said XML tree, wherein said incremental queries are based on changes to said relational database; and apply said mapped change to said XML tree to incrementally generate said recursive XML view, wherein said recursive XML view conforms to said predefined recursive schema.

16. The apparatus of claim 15, wherein said one or more incremental queries comprises a recursive query.

17. The apparatus of claim 15, wherein said processor is further configured to submit one or more of said incremental queries to said relational database, wherein said incremental queries are based on changes to said relational database; determine from the results of said incremental queries one or more edges in said XML tree to be removed; determine from the results of said incremental queries one or more edges in said XML tree to be inserted; insert said edges; determine one or more new subtrees to be created under said inserted edges; and insert said subtrees.

18. The apparatus of claim 15, wherein said processor is further configured to determine one or more relational views based on a structure of said XML view; provide said one or more relational views to be applied to said relational database; obtain one or more changes to said relational view; and use said one or more changes to said relational view to update said XML tree.

19. The apparatus of claim 18, wherein said processor is further configured to identify portions of said XML view that are recursive and generate one or more corresponding recursive relational views.

20. An article of manufacture for incremental update of an XML tree defined from a recursive XML view of a relational database, comprising a tangible machine readable recordable medium containing one or more programs which when executed implement the steps of:
- obtaining a predefined recursive schema;
- detecting at least one change to said relational database;
- providing one or more incremental queries to said relational database to map said change to said relational database into changes to said XML tree, wherein at least one component of a definition of said one or more incremental queries is executed a plurality of times in traversing a path through said XML tree, wherein said incremental queries are based on said changes to said relational database; and
- applying said mapped change to said XML tree to incrementally generate said recursive XML view, wherein said recursive XML view conforms to said predefined recursive schema.

* * * * *